C. E. Zimmerman.
Churn.
N° 81,056. Patented Aug. 11, 1868.
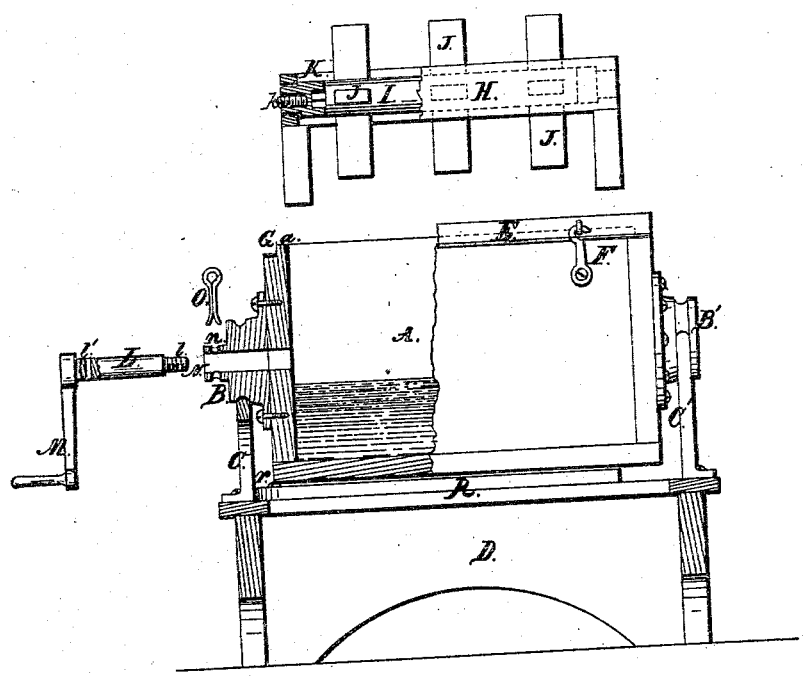
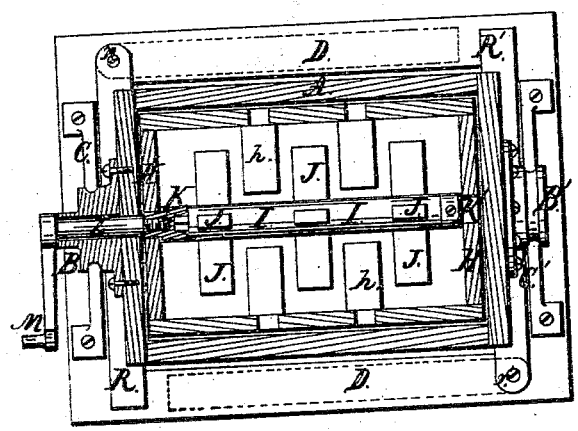
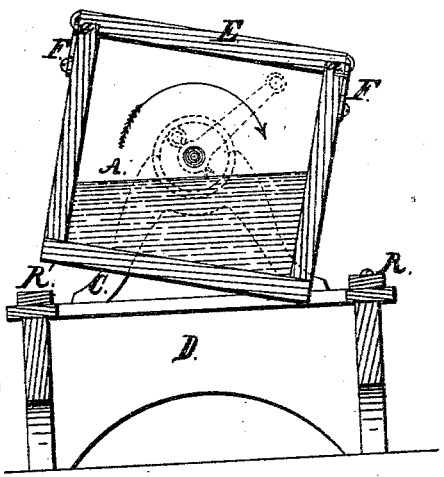
Witness:
Jas. H. Layman
Inventor:
C. E. Zimmerman
By Knight Bros.
Attys.

United States Patent Office.

CHARLES E. ZIMMERMAN, OF CINCINNATI, OHIO.

Letters Patent No. 81,056, dated August 11, 1868.

IMPROVEMENT IN CHURNS.

*The Schedule referred to in these Letters Patent and making part of the same.*

TO WHOM IT MAY CONCERN:

Be it known that I, CHARLES E. ZIMMERMAN, of Cincinnati, Hamilton county, Ohio, have invented a new and useful Improvement in Churns; and I hereby declare the following to be a full, clear, and exact description thereof, reference being had to the accompanying drawings making part of this specification.

My invention relates to that class of churns in which the butter is produced by the revolution, within the cream-chamber, of a shaft, provided with a series of radial arms; and my invention consists in constructing the implement in such a manner that the dashers can be removed as soon as the butter forms, and the cream-chamber itself revolved for the purpose of gathering the butter.

In the accompanying drawings—

Figure 1 is a side elevation, partially in section, of my improved churn, with the operating-handle or winch and the dashers and frame detached.

Figure 2 is a horizontal section of the implement when in condition for churning, and Figure 3 is a transverse section, showing the manner of operating the churn when it is desired to gather the butter.

The cream-chamber A is a rectangular vessel, whose ends are provided with gudgeons, B B, that are journalled in standards, C C', which project upwardly from the frame D.

This chamber is provided with a lid, E, which is maintained in position by the rebate $a$ and hooks F.

G is a gasket, which is interposed between the lid and chamber for the purpose of producing a water-tight joint.

Fitted within the chamber A is a removable frame, H, within which is journalled a shaft, I, that is provided with a number of radial blades or dashers, J.

The frame H has attached to it a number of horizontal arms, $h$, which project inwardly towards the shaft I, and these arms are arranged so as to be equidistant from the blades or dashers J.

The shaft has two journal-bearings, K K', one of which, K, is provided with a screw-threaded socket, $k$, for the reception of the screw-threaded end $l$ of a small shaft, L, which is secured to the crank, M.

The shaft L is provided near its outer end with an aperture, $l'$, for a purpose which will hereafter be explained.

The gudgeon B is provided with an axial aperture, N, of a suitable size to receive the crank-shaft L.

O is a spring-pin, which, when inserted in the apertures $l$ $n$ of the crank-shaft, and gudgeon B respectively, unites them, so that when said crank is turned, the cream-chamber will rotate with it.

Pivoted to opposite sides of the frame D, at $r$ $r'$, are two brackets R R', which are adapted to swing in a horizontal plane, and to prevent the rotation of the cream-chamber when they are turned under the same, as shown in fig. 2.

In churning, the brackets R R' are swung around so as to pass under the cream-chamber A, and thereby prevent the rotation of said chamber, as shown in fig. 2. The frame H $h$, together with its shaft I J, is then placed in the chamber A, and the shaft L inserted in the aperture N, and the screw-threaded portion, $l$, of said shaft caused to engage with the nut $k$.

A sufficient quantity of cream is now poured into the chamber, and the dashers J rotated by means of the crank, M, thereby causing the most thorough and complete agitation of the cream, and when the butter is formed, it is gathered in the following manner:

The shaft L is unscrewed from the nut $k$, so as to permit of the frame H and its accompanying dashers being removed from the cream-chamber. The brackets R R' are swung back so as to rest upon the top of the frame D, and to be parallel with the sides of the chamber A, as shown in figs. 1 and 3, and by dotted lines in fig. 2. The shaft L is again inserted in the aperture N, and the spring-pin O is passed through the apertures $l$ $n$, thereby connecting said shaft L with the gudgeon B, and as the brackets are no longer under the cream-chamber, it will be seen that the latter will have a corresponding rotation with the crank, M, as shown in fig. 3.

It will be seen that the different members of my churn can be detached in a few minutes, so as to permit of the implement being thoroughly cleaned, and the chamber A can be lifted from its bearing C C′ without unscrewing or disconnecting any of the working parts.

I claim herein as new, and of my invention—

The arrangement, substantially as described, of the cream-chamber A, bearings B B′ C C′, removable frame H, with its shaft I k and dashers J, crank-shaft L l l′ M, apertures N n, and swinging brackets R R′, or devices substantially equivalent, for the purpose set forth.

In testimony of which invention, I hereunto set my hand.

CHARLES E. ZIMMERMAN.

Witnesses:
   Geo. H. Knight,
   James H. Layman.